(12) United States Patent
Ketharaju et al.

(10) Patent No.: US 11,354,666 B1
(45) Date of Patent: Jun. 7, 2022

(54) SMART DUST USAGE

(71) Applicant: Wells Fargo Bank, N.A., San Francisco, CA (US)

(72) Inventors: Rameshchandra Bhaskar Ketharaju, Hyderabad (IN); Sarath Chava, Hyderabad (IN); Prasad N. Sivalanka, SeriLingampally (IN); Madhu V. Vempati, Hyderabad (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 330 days.

(21) Appl. No.: 15/165,749

(22) Filed: May 26, 2016

(51) Int. Cl.
*G06Q 20/40* (2012.01)
*G06Q 20/32* (2012.01)
*H04L 9/40* (2022.01)
*G06Q 20/36* (2012.01)

(52) U.S. Cl.
CPC ..... *G06Q 20/40145* (2013.01); *G06Q 20/322* (2013.01); *G06Q 20/36* (2013.01); *H04L 63/102* (2013.01)

(58) Field of Classification Search
CPC ............... G06Q 20/322; G06Q 20/36; G06Q 20/40145; H04L 63/102
USPC ......................................................... 705/50
See application file for complete search history.

(56) References Cited

U.S. PATENT DOCUMENTS

| | | | |
|---|---|---|---|
| 7,486,795 B2 | 2/2009 | Eschenauer et al. | |
| 8,150,037 B2 | 4/2012 | Luk et al. | |
| 8,239,169 B2 | 8/2012 | Gregory et al. | |
| 8,335,304 B2 | 12/2012 | Petite | |
| 8,990,576 B2 | 3/2015 | Jakobsson | |
| 9,895,110 B2 * | 2/2018 | Lin ...................... | A61B 5/6816 |
| 2008/0221943 A1 * | 9/2008 | Porter et al. | |
| 2008/0302672 A1 * | 12/2008 | Sandvik ............ | G01N 33/2841 |
| | | | 205/775 |
| 2014/0337621 A1 | 11/2014 | Nakhimov | |
| 2015/0058133 A1 | 2/2015 | Roth et al. | |

(Continued)

FOREIGN PATENT DOCUMENTS

| | | | |
|---|---|---|---|
| EP | 1103939 B1 * | 11/1999 | ............... G08G 1/01 |
| WO | 2011047548 | 4/2011 | |

OTHER PUBLICATIONS

An Introduction to MEMS, Jan. 2002.*

(Continued)

*Primary Examiner* — James D Nigh
*Assistant Examiner* — Yin Y Choi
(74) *Attorney, Agent, or Firm* — Womble Bond Dickinson (US) LLP (57) ABSTRACT

Systems and methods that facilitate authenticating a user making a payment using microelectromechanical systems (MEMs) devices (i.e., smart dust). The MEMs devices may have sensors that collect data and transfer it to a base station device. The MEMs devices can collect sensor data, including biometric data and/or capture images of the person. The MEMs can also collect sensor data such as audio data, optical data, temperature data, pressure data, and motion data and compare it to data associated with a user profile to determine that the person making the payment is the same person associated with the user profile. Once the person's identity has been confirmed, and thus authenticated, the payment request can be confirmed and payment made, via either the mobile device or credit card.

17 Claims, 10 Drawing Sheets

(56) References Cited

U.S. PATENT DOCUMENTS

| | | | |
|---|---|---|---|
| 2015/0288687 A1* | 10/2015 | Heshmati et al. | |
| 2016/0072802 A1* | 3/2016 | Hoyos | |
| 2016/0364559 A1* | 12/2016 | Bali et al. | |
| 2017/0061424 A1* | 3/2017 | Dent | |
| 2017/0131716 A1* | 5/2017 | Brekke et al. | |
| 2017/0193314 A1* | 7/2017 | Kim | G06K 9/00885 |
| 2017/0244703 A1* | 8/2017 | Lee | H04L 63/0492 |
| 2017/0310775 A1* | 10/2017 | Tatourian et al. | |

OTHER PUBLICATIONS https://www.silabs.com/documents/public/application-notes/AN367.pdf (Year: 2014).*
Next century challenges: mobile networking for "Smart Dust" (Year: 1999).*
A Resource Guide to Wearable Device Sensors, http://anuva.com/blog/a-resource-guide-to-wearable-device-sensors/, 2014 (Year: 2014).*
"Connected Air: Smart Dust is the Future of the Quantified World"; retrieved from http://readwrite.com/2013/11/14/what-is-smartdust-what-is-smartdust-used-for/.
Anderson, Ross, et al.. "Key Infection: Smart Trust for Smart Dust", Conference: Network Protocols, 2004 ICNP, Proceedings of the 12th IEEE International Conference on Network Protocols, Nov. 2004, 10 pages.
Peter, Steffen, et al. "Public key cryptography empowered smart dust is affordable", International Journal of Sensor Networks, vol. 4, Issue 1/2, Jul. 2008, pp. 130-143.
Sammarco, John, et al. "A Technology Review of Smart Sensors With Wireless Networks for Applications in Hazardous Work Environments", 2007, retrieved from: http://www.cdc.gov/niosh/mining/UserFiles/works/pdfs/2007-114.pdf.

* cited by examiner

SMART DUST USAGE

BACKGROUND

As people increasingly use mobile devices to make payments either online, or in person at point of sale devices, authentication becomes increasingly important. Verifying the identity of the person using the mobile device to make the payment is important to decrease the risk of fraud and illicit payments. Authentication is also important when using credit cards and other physical forms of payment with digital payment information embedded thereon. Smart cards that store data on integrated circuits rather than magnetic stripes and require chip-and-PIN or chip-and-signature for verification are an improvement, but even they cannot completely prevent others from using the card if the PIN number or signature is known. Using current technology, it is not possible to make sure that the person using the card is physically present at the time of payment.

SUMMARY

The following presents a simplified summary in order to provide a basic understanding of some aspects of the innovation. This summary is not an extensive overview of the innovation. It is not intended to identify key/critical elements or to delineate the scope of the innovation. Its sole purpose is to present some concepts of the innovation in a simplified form as a prelude to the more detailed description that is presented later.

The disclosure disclosed and claimed herein, in one aspect thereof, includes systems and methods that facilitate authenticating a user making a payment using smart dust. Smart dust, as discussed herein is a system of small microelectromechanical systems (MEMs) devices that can have sensors that collect data and transfer it to a base station device. The MEMs devices can collect sensor information about the person, capturing audio data, optical data, temperature data, pressure data, and motion data and compare it to data associated with a user profile to determine that the person making the payment is the same person associated with the user profile. The sensor data can comprise biometric data relating to the height of the person, weight of the person, heart rate or pulse of the person, blood pressure, and or body temperature. The sensor data can also capture images of the person, and facial recognition can be performed to authenticate the person. Once the person's identity has been confirmed, and thus authenticated, the payment request can be confirmed and payment made, via either the mobile device or credit card.

The MEMs devices can be small enough that they can be suspended in the air and in some embodiments be self-propelled. In an embodiment, the MEMs devices/sensors can be issued by one or more financial institutions associated with either a point of sale device or the credit cards or banks. The MEMs devices can be carried by the person or stored in a base station device. In response to determining that a payment is being made, and authentication is required, the base station device can activate the MEMs devices which can proceed to collect data to authenticate the user. In an embodiment, the base station device or the MEMs devices can determine which MEMs devices to activate, based on the signal to noise ratio of data received from the devices, or based on the quality of data received. In other embodiments, the MEMs devices can be selected based on other contextual or environmental factors. For instance, audio sensors to detect heart rate or breathing rate may not be activated when ambient sound levels are above a predetermined level. Similarly, optical sensors may not be activated if light levels are below another predetermined level.

For these considerations, as well as other considerations, in one or more embodiments, a base station device can include a memory to store computer-executable instructions and a processor, coupled to the memory, to facilitate execution of the computer-executable instructions to perform operations. The operations can include receiving a request for authentication associated with a user access request. The operations can also include transmitting an instruction to collect sensor data to a set of microelectromechanical systems sensors. The operations can also include receiving the sensor data from the set of microelectromechanical systems sensors, wherein the sensor data comprises biometric data. The operations can also include authenticating the user access request based at least in part on the biometric data In another embodiment, a method comprises determining, by a base station device comprising a processor, that an access request is to be authenticated, wherein the access request is associated with a user profile. The method can also include transmitting an instruction to activate a set of microelectromechanical systems devices, wherein the set of microelectromechanical systems devices are configured to collect sensor data. The method can also include receiving the sensor data from the set of microelectromechanical systems devices, wherein the sensor data comprises biometric data. The method can also include authenticating the user access request based at least in part on the biometric data matching data associated with user profile.

In another embodiment, a non-transitory computer-readable device, storing thereon, computer-executable instructions, that when executed by a processing device, perform operations including determining that an access request is to be authenticated, wherein the access request is associated with a user profile. The operations can also include transmitting an instruction to activate a set of microelectromechanical systems devices, wherein the set of microelectromechanical systems devices are configured to collect sensor data. The operations can also include receiving the sensor data from the set of microelectromechanical systems devices, wherein the sensor data comprises biometric data. The operations can also include authenticating the user access request based at least in part on the biometric data matching data associated with user profile.

To accomplish the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

The following terms are used throughout the description, the definitions of which are provided herein to assist in understanding various aspects of the disclosure.

As used in this disclosure, the term "device" or "client device" refers to devices, items or elements that may exist in an organization's network, for example, users, groups of users, computer, tablet computer, smart phone, iPad®, iPhone®, wireless access point, wireless client, thin client, applications, services, files, distribution lists, resources, printer, fax machine, copier, scanner, multi-function device, mobile device, badge reader and most any other networked element.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

While specific characteristics are described herein, it is to be understood that the features, functions and benefits of the innovation can employ characteristics that vary from those described herein. These alternatives are to be included within the scope of the innovation and claims appended hereto.

While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 1:
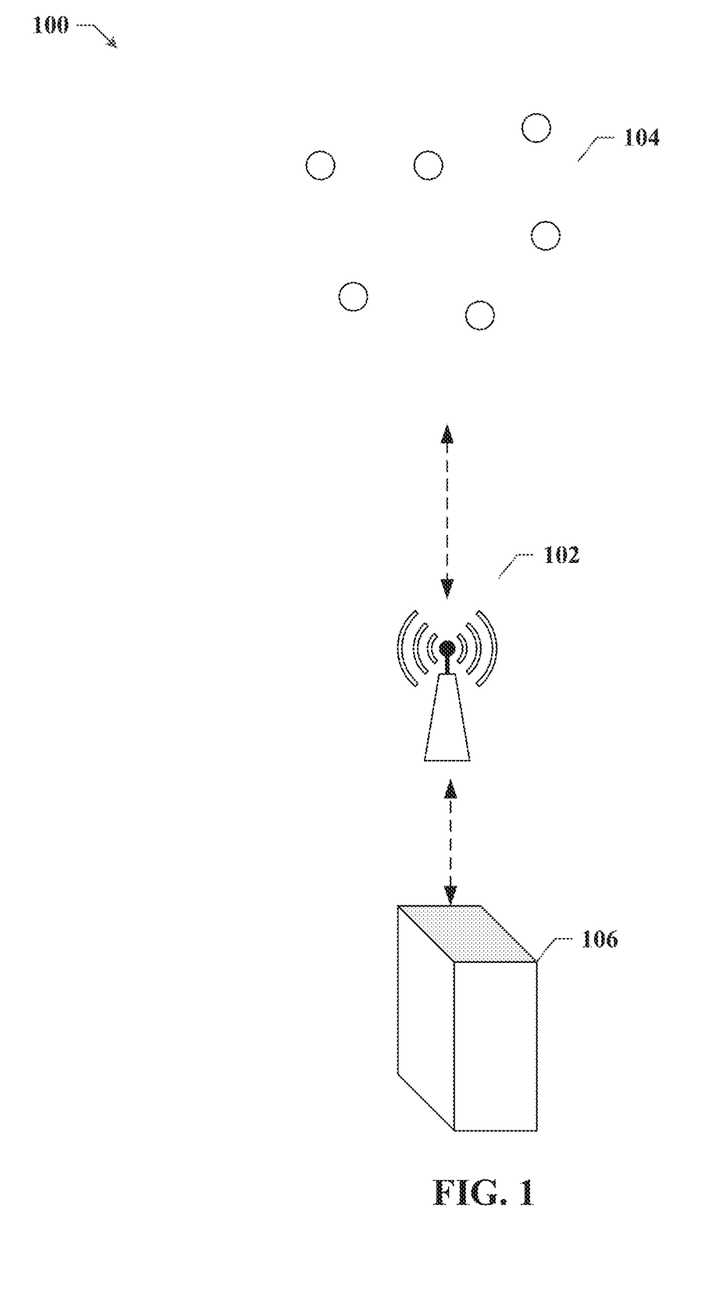
FIG. 1 is an illustration of an example system for authenticating a user using smart dust in accordance with one or more aspects of the disclosure.

FIG. 1 illustrates an example system 100 for authenticating a user using smart dust in accordance with one or more aspects of the disclosure. In an embodiment, smart dust 104, can collect sensor data associated with a user, and then communicate that sensor data to base station device 102. In an embodiment, the sensor data can be forwarded to a server 106 that can process the sensor data to perform an authentication of the user based on the sensor data. In other embodiments, the base station devcice 102 can analyze the sensor data collected by smart dust 104 to authenticate the user, and then pass a notification of authentication to server 106.

In an embodiment, smart dust 104 can be made up of MEMs device sensors that can collect a variety of sensor data. The MEMs device sensors can collect optical data, infrared data, audio data, electromagnetic field data, temperature data, air pressure data, location data and/or motion data.

The optical data can include data used to perform facial or body recognition. The optical data can also be used to gather biometric data (e.g., weight of the user, facial recognition data, fingerprint data, and etc.) in conjunction with one or more sets of data from the other sensors. The audio data can be used to authenticate a user based on voice recognition, or can be used to detect heart rate, blood pressure, and other biometric data. The infrared data can be used to determine various biometric data about a person such as breathing rate, body temperature, and etc. The electromagnetic field data can be used to measure magnetic fields and/or read any RFID tags that the user may carry. The motion data and air pressure data can be used to monitor for heart rate, breathing rate, and other biometric data. The location data can be GPS data or other location data (determined via inertial sensing or network location) that can try to identify the location of the smart dust 104.

The MEMs device sensors (or "motes") that make up smart dust 104 can be suspended in air and surround, or be near a user while collecting data. In some embodiments, the motes can be self-propelled and able to move around. In other embodiments, the motes may move passively on wind currents, or using Brownian motion. In an embodiment, the motes can be released by base station 102 upon activation. The motes may also be carried by a user and released when the user attempts to make a purchase using a mobile payment or a credit card payment. In an embodiment, the base station device 102 can be part of a point of sale system at a retail or customer service establishment. In other embodiments, base station device 102 can be carried by a user or be a mobile device carried by the user and store the motes therein.

In an embodiment, the motes of the smart dust 104 can be provided by a financial institution associated with server 106. In this embodiment, the motes can be configured with metadata information such as the relationship details of the customer, and also the family of MEMs/motes that were provided to the customer. The individual motes would have the same parent information and some specific information of that individual mote. The group of motes can form a network and act as a close field communicating devices (some of the motes can transmit data to the base station 102 and other motes can relay information from other motes to the base station 102. Some of the motes can also perform some processing that normally is performed by the base station 102. In this way, the motes can act as a circuit junction for the series of motes. Since the motes can form a circuit, motes that are provided that are not part of the group provided by the financial institution can break the circuit, thus making identification of the foreign mote easy.

In an embodiment, the smart dust 104 can be activated in response to receiving a notification that the user is trying to make a payment. For instance, the user can try to make a payment with their mobile device, or with a credit card, and server 106 can send a notification of pending payment or an authorization request to base station device 102. Base station device 102 can then send an instruction to activate the smart dust 104, which can proceed to collect sensor data relating to the user. The sensor data can be used to authenticate the user, and then server 106 can proceed to process the payment or send a notification about authentication to the payment processor.

In an embodiment, the base station device 102 can compare the sensor data received from the smart dust 104 to a user profile, and based on the similarity, authenticate the user. For instance, if a set of biometric data matches the user profile stored biometric data within a predetermined range, then the user can be authenticated. If there are multiple types of biometric data being compared, the similarity may not need to be as close. For instance, if only data relating to facial recognition is collected, and the data matches 94% of the user profile data, then the authentication, which may require a 95% match, may fail. If the facial recognition data, which matches at 94%, is used in conjunction with heart rate data which also matches at 94%, then the authentication may be confirmed. Various matching rates can be authenticated based on the different combinations of sensor data types. Certain forms of biometric data may be considered of a higher quality, or functionality for the purposes of authentication than other types of biometric data. For instance, optical scanning which scans fingerprints can be more definitive for the purposes of authenticating a user than heart rate data. The predetermined matching levels can be set accordingly based on the type of data being collected.

In an embodiment, base station device 102 can determine whether to collect data from one or more of the motes of the set of MEMs devices that make up smart dust 104. For instance, the communications between the base station device 102 and the individual motes may have interference or increased packet loss (e.g., due to range from the base station device 102) for certain motes. If the signal to noise ratio for communications from particular motes to the base station device 102 is below a predetermined criterion, the mote may not be selected for authenticating the user. In other embodiments, the environmental context may reduce the efficacy of the sensor data received from certain types of sensors. For instance, if the lighting is poor, optical data may be of less value than temperature, audio and pressure data. In other embodiments, if the ambient noise level is high, optical data may be of more value than audio data.

In an embodiment, the MEMs devices of the smart dust 104 can include respective identification numbers (e.g., serial numbers). When transmitting the sensor data to the base station device 102, the motes can send the serial numbers as well. Since the smart dust 104 may be issued to the user by the financial institution associated with the credit card or payment method, the smart dust 104 serial numbers can also be used to authenticate the user and allow the payment to proceed.

The serial numbers can be used to generate a virtual card number that is established based on a communication channel between the smart dust 104 and the credit card or other payment method. Once the user is authenticated, the virtual number can be used to process the payment. If the smart dust 104 is not in the vicinity of the credit card, the virtual number may not be generated, and the payment will not proceed. In an embodiment, the virtual number can be based on a function of the biometric data and the respective identification numbers.

In an embodiment, the MEMs devices of the smart dust 104 can be used to generate a unique key that is created as a token. This can be performed on the client side with the base station device 102, and the smart dust network 104. An algorithm can be used to generate a unique key from the connected motes to enable a transaction. The customer device or channels can be interlaced with smart dust 104 using very near field communications. The channels can be between a point of sale device, a mobile device, or any other devices that have biometric scanning enabled in order to capture fingerprint images, retina scans, etc. The subset of selected motes by a customer can form a pattern where the mote IDs can form a "String". The "Smart Key" can be generated as a String along with biometric image customer device type. Based on the motes selection, the string can have nCr probability where r is the customer selected subset motes count and n is superset of all motes available with customer. The motes IDs could be static or dynamic in nature. If static, the mote can emit a number and if dynamic, the motes can emit random numbers (the same dynamic number ID emotion logic will be applied to decryption also).

The string can be a combination of first and last characters of a selected number of "Motes IDs" in smart dust 104 that forms a string. A biometrics image can include either fingerprint or retina, or both. The biometrics image can be stored as Binary Large Object (BLOB) or equivalent data type.

For static smart keys, the string along with biometrics image blob and device type will form a "Smart Key". As an example of a static smart key, if there eight motes say, 1, 2, 3, 4, 5, 6, 7 and 8 and the customer selected 1, 3, and 7, the first and last characters of mote IDs, mote 1—'$ and Z', mote 2—'~ and 5', and mote 3—'7 and 8'.

For Dynamic Key Generation, the bank supplies preconfigured set of motes (a family of motes). These family of motes are configured based on the customer details like the account number, name of the customer, expiry date of the motes, sibling mote details, parameters of the activities each mote would perform. The motes in the family can be numbered in a series or at random could be a alphanumerical or numeric. The bank supplied family of motes (e.g., 8 motes) can be used like a Makeup Kit (foundation, concealer, blush, eye shadow, eye liner, power, lipstick, etc.). Each mote in the family can perform an individual activity as in the makeup kit, these could be GPS, Ambient Temperature, Body temperature, Pulse, Altitude, Color Sensor, Sound Sensor, IR sensor, image scanner, optical LOS, etc. Customer evaluate what you wear daily and what you don't wear. The essential daily wear can be considered as mandatory. The other combinations could be for special occasions, and extra care. The customer wears what is a daily wear mandated, say minimum two motes. The customer would wear the additional motes from the family in some embodiments. The recommended motes that are required to form an network are specified by a business rule say for example 3 such motes. Now as two of the motes are mandatory the customer has an option to pick up at least one additional mote from the family.

The customer/Base Station device validates the Motes ID details and determine whether the motes are active and whether the mote reading unit is correct. The data received by from the motes are relevant as per motes design, eg. First motes information received by the device is temperature in centigrade? The unit can be in centigrade, NW/NE/SE/SW, /min (preferable in dimensional analysis unites). The customer/base station device can form a smart key and transmits via 3G/4G/5G/Wi-Fi along with the supplementary data. Transmitted information=Smart Key=[Mote ID]+ [Mote information]. Mote information can include a specified mote reading+Signal strength information+time stamp. The signal strength information can be in dB-microvolts per meter (dBµV/m) Or dBu e.g. 60 dBu. The time stamp is the time at which the base station had transmitted the key.

On the server side, the utility engine can receive the key from the client side and grants access or denies access (transfer key). The utility engine can recognize the transfer key and communicates with IDM server. The IDM server maintains a log in the persona management system. Upon authentication, the IDM grants access to the financial banking systems as applicable.

Figure 2:
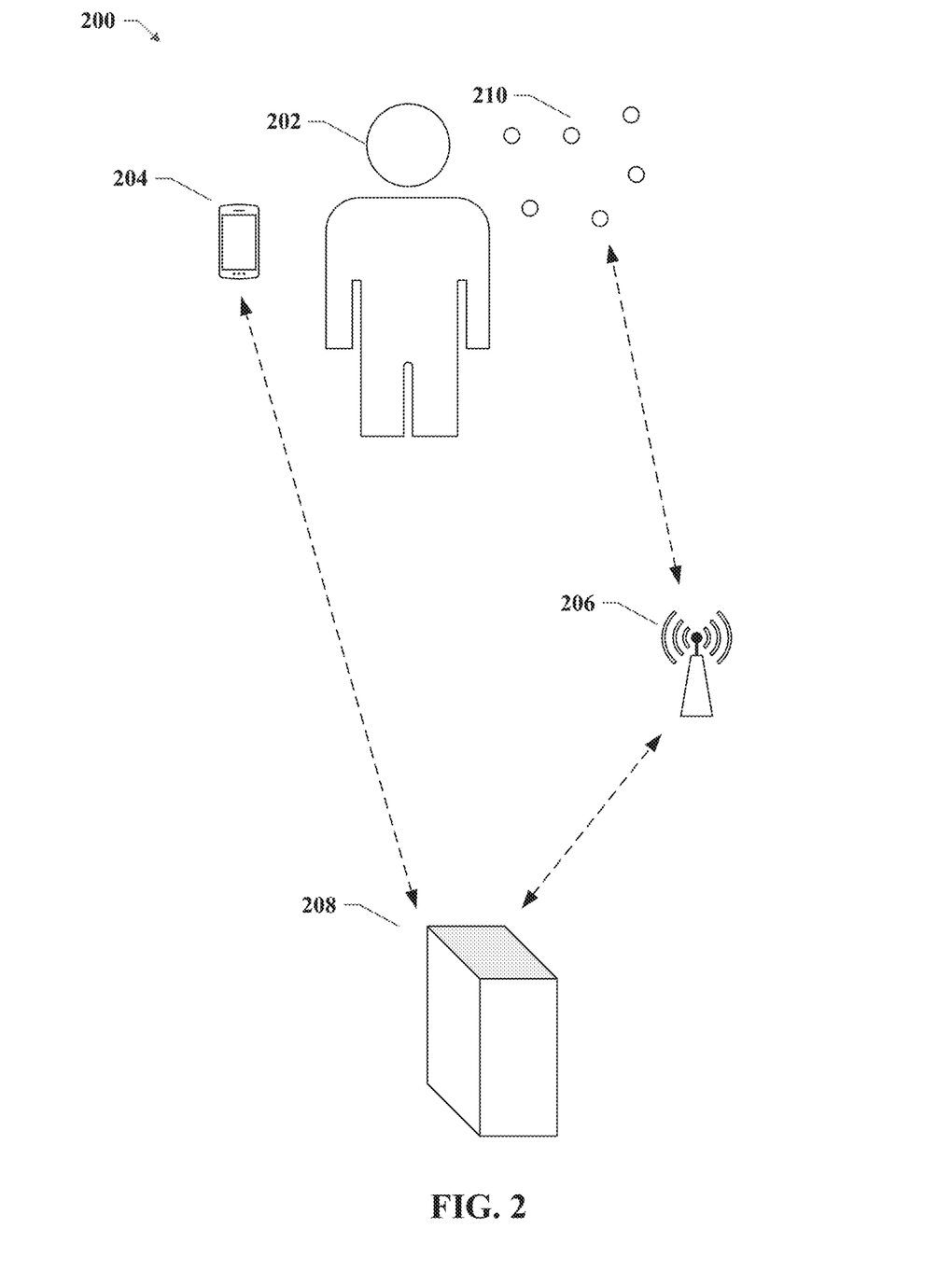
FIG. 2 is an illustration of an example system for authenticating a user using smart dust in accordance with one or more aspects of the disclosure.

The server side decryption algorithm can be as follows: 1) Decrypt <Key>. 2) Validate Approved motes with nCr probability (Approval Motes). 3) Validate customer biometric image (approval Customer Finger Print or Retina or both. 4) Verify the mote information data. 5) The correctness with in an acceptable variation. 6) Since the customer/base device is very near to motes, the emitted information should not have huge variations with device data. 7) E.g. Mote 01 emitted temperature as 23 C, and Mote 02 emitted 377833N, 1224167 W (last four digits are decimals) Mote 03 emitted 88. Since first two information's are near to device it can validate with an allowed variation. Since customer profile knows to the device, it also validates the pulse. 8) Validates the signal strength. 9) If all the mote are not having signal strength with a specified variation i.e. if one or more motes signal strength is deviating the rest can be called for suspicious transaction Turning now to FIG. 2, illustrated is example system 200 for authenticating a user using smart dust in accordance with one or more aspects of the disclosure.

In system 200, a base station device 206 can receive an alert that a user 202 is attempting to initiate a payment using a mobile device 204, and the base station device can send an instruction to activate a set of smart dust device 210 to authenticate user 202. The mobile device 204 can send a payment request notification to server 208. Before processing the payment, the server can try to authenticate the user 202 making the payment. The server can send an authentication request to base station device 206 which can activate the smart dust 210 which collects sensor data about the user 202. The sensor data can be returned to the base station device 206 which can perform the authentication. In other embodiments, the base station device 206 can forward the sensor data to server 208 which can perform the authentication. Once the authentication is performed, server 208 can process the payment from mobile device 204.

In an embodiment, smart dust 210 can be made up of MEMs device sensors that can collect a variety of sensor data. The MEMs device sensors can collect optical data, infrared data, audio data, electromagnetic field data, temperature data, air pressure data, location data and/or motion data.

The optical data can include data used to perform facial or body recognition. The optical data can also be used to gather biometric data (e.g., weight of the user 202, facial recognition data, fingerprint data, and etc.) in conjunction with one or more sets of data from the other sensors. The audio data can be used to authenticate a user based on voice recognition, or can be used to detect heart rate, blood pressure, and other biometric data. The infrared data can be used to determine various biometric data about a person such as breathing rate, body temperature, and etc. The electromagnetic field data can be used to measure magnetic fields and/or read any RFID tags that the user may carry. The motion data and air pressure data can be used to monitor for heart rate, breathing rate, and other biometric data. The location data can be GPS data or other location data (determined via inertial sensing or network location) that can try to identify the location of the smart dust 210.

The MEMs device sensors (or "motes") that make up smart dust 210 can be suspended in air and surround, or be near the user 202 while collecting data. In some embodiments, the motes can be self-propelled and able to move around. In other embodiments, the motes may move passively on wind currents, or using Brownian motion. In an embodiment, the motes can be released by base station 206 upon activation. The motes may also be carried by a user and released when the user attempts to make a purchase using a mobile payment or a credit card payment. In an embodiment, the base station device 206 can be part of a point of sale system at a retail or customer service establishment. In other embodiments, base station device 206 can be carried by the user 202 by a mobile device 204.

In an embodiment, the base station device 206 can compare the sensor data received from the smart dust 21- to a user profile, and based on the similarity, authenticate the user. For instance, if a set of biometric data matches the user profile stored biometric data within a predetermined range, then the user 202 can be authenticated. If there are multiple types of biometric data being compared, the similarity may not need to be as close. For instance, if only data relating to facial recognition is collected, and the data matches 94% of the user profile data, then the authentication, which may require a 95% match, may fail. If the facial recognition data, which matches at 94%, is used in conjunction with heart rate data which also matches at 94%, then the authentication may be confirmed. Various matching rates can be authenticated based on the different combinations of sensor data types. Certain forms of biometric data may be considered of a higher quality, or functionality for the purposes of authentication than other types of biometric data. For instance, optical scanning which scans fingerprints can be more definitive for the purposes of authenticating a user than heart rate data. The predetermined matching levels can be set accordingly based on the type of data being collected.

Figure 3:
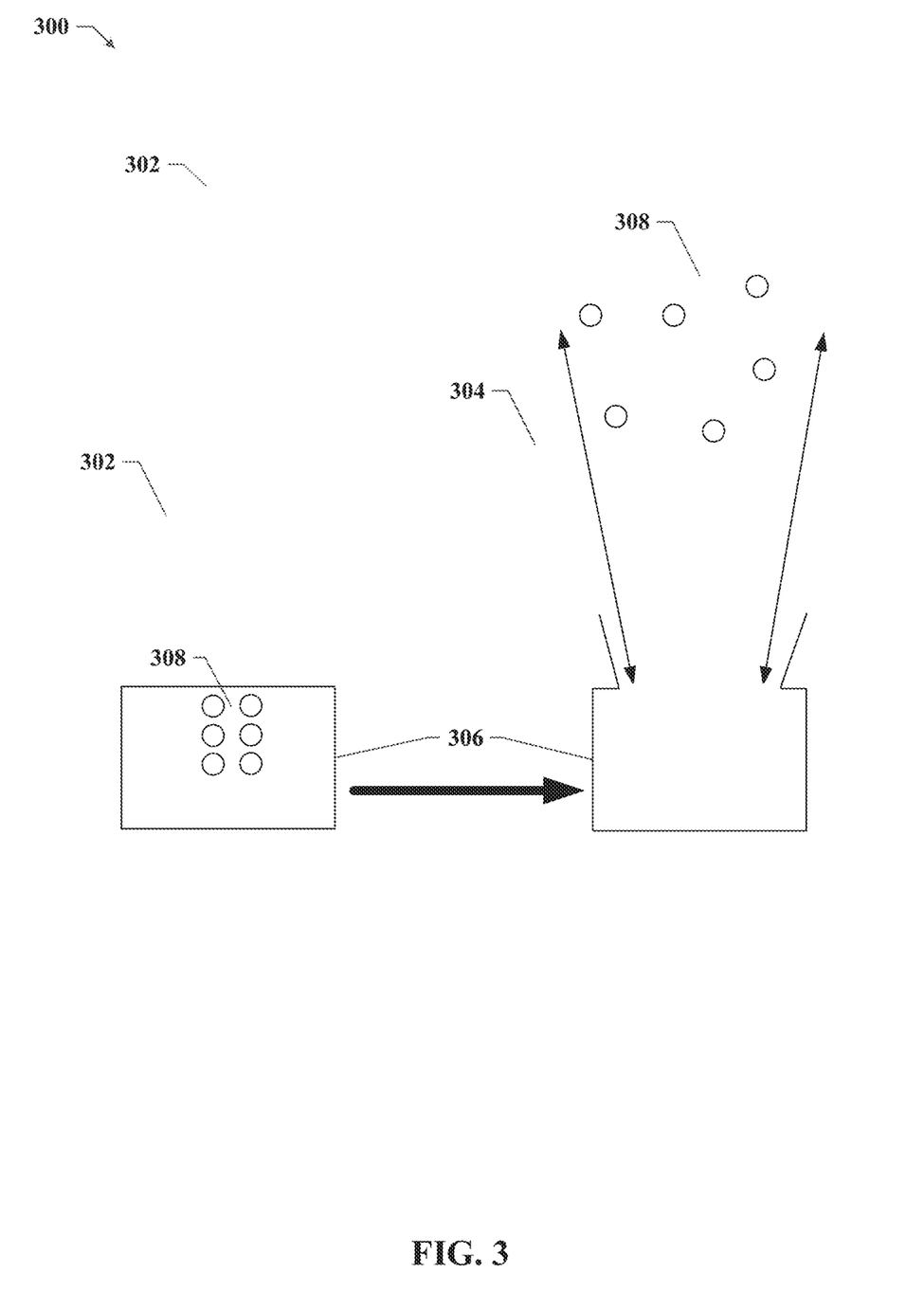
FIG. 3 is an illustration of an example system for activating a set of smart dust motes in accordance with one or more aspects of the disclosure.

Turning now to FIG. 3, illustrated is an example system 300 for activating a set of smart dust motes in accordance with one or more aspects of the disclosure.

In an embodiment, the smart dust 308 can be activated in response to receiving a notification that the user is trying to make a payment. For instance, at 302, the user can try to make a payment with their mobile device, or with a credit card, and a server can send a notification of pending payment or an authorization request to base station device 306. Base station device 306 can then send an instruction to activate the smart dust 308. At 304, the base station device 306 can release the smart dust 308 which can proceed to collect sensor data relating to the user. The sensor data can be used to authenticate the user. The smart dust 308 can send the sensor data to base station device 306 which can perform the authentication in some embodiments, or can send the sensor data to the server to perform the authentication.

Figure 4:
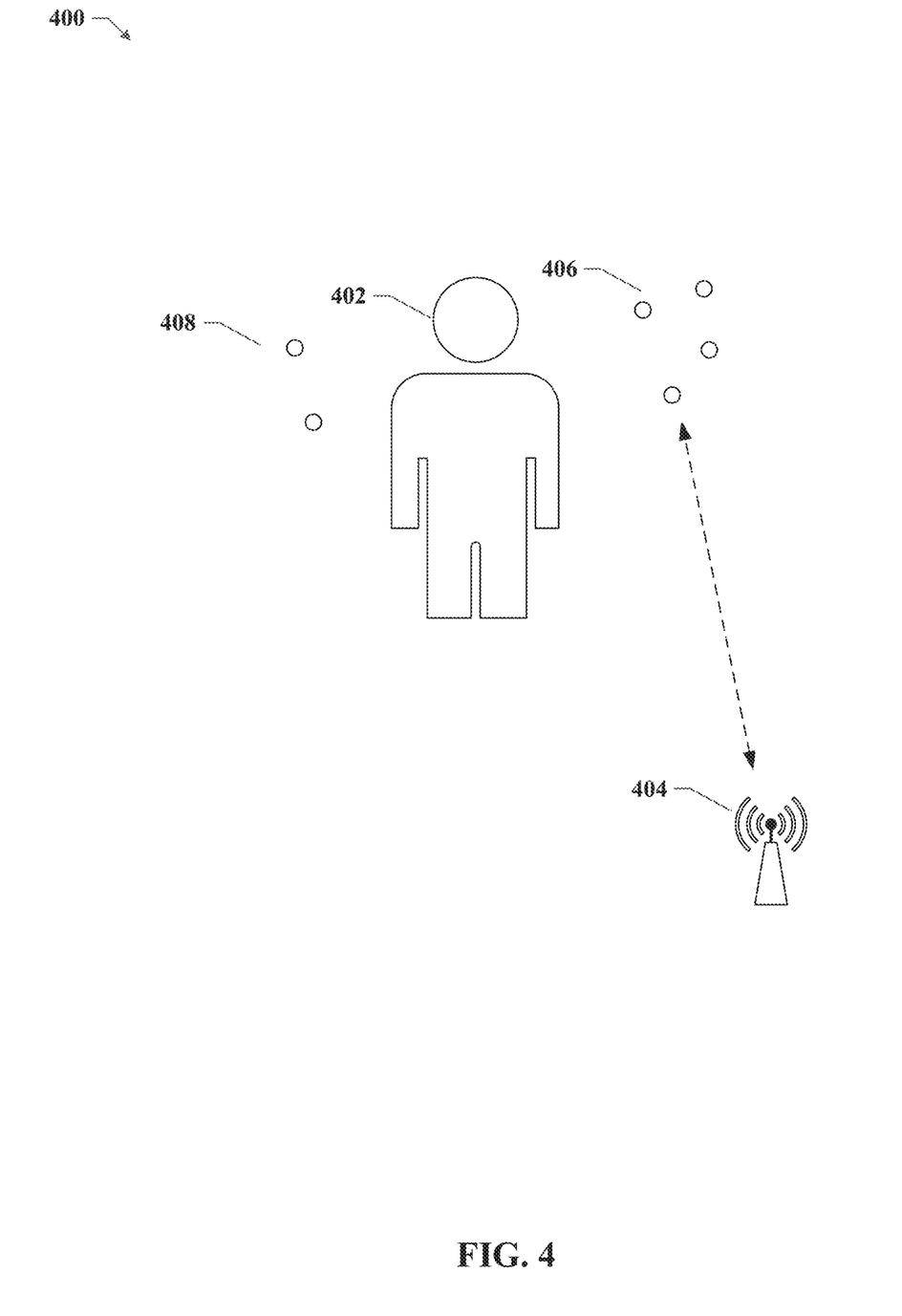
FIG. 4 is an illustration of an example system for selecting a set of smart dust motes to authenticate a user in accordance with one or more aspects of the disclosure.

Turning to FIG. 4, illustrated is an example system 400 for selecting a set of smart dust motes to authenticate a user in accordance with one or more aspects of the disclosure.

In an embodiment, base station device 404 can determine whether to collect data from one or more of the motes (e.g., motes 406) of the set of MEMs devices that make up the smart dust used to authenticate the user 402. For instance, the communications between the base station device 404 and the motes 408 may have interference or increased packet loss due to range from the base station device 404. If the signal to noise ratio for communications from motes 408 to the base station device 404 is below a predetermined criterion, the mote may not be selected for authenticating the user. In other embodiments, the environmental context may reduce the efficacy of the sensor data received from certain types of sensors. For instance, if the lighting is poor, optical data may be of less value than temperature, audio and pressure data. In other embodiments, if the ambient noise level is high, optical data may be of more value than audio data.

Figure 5:
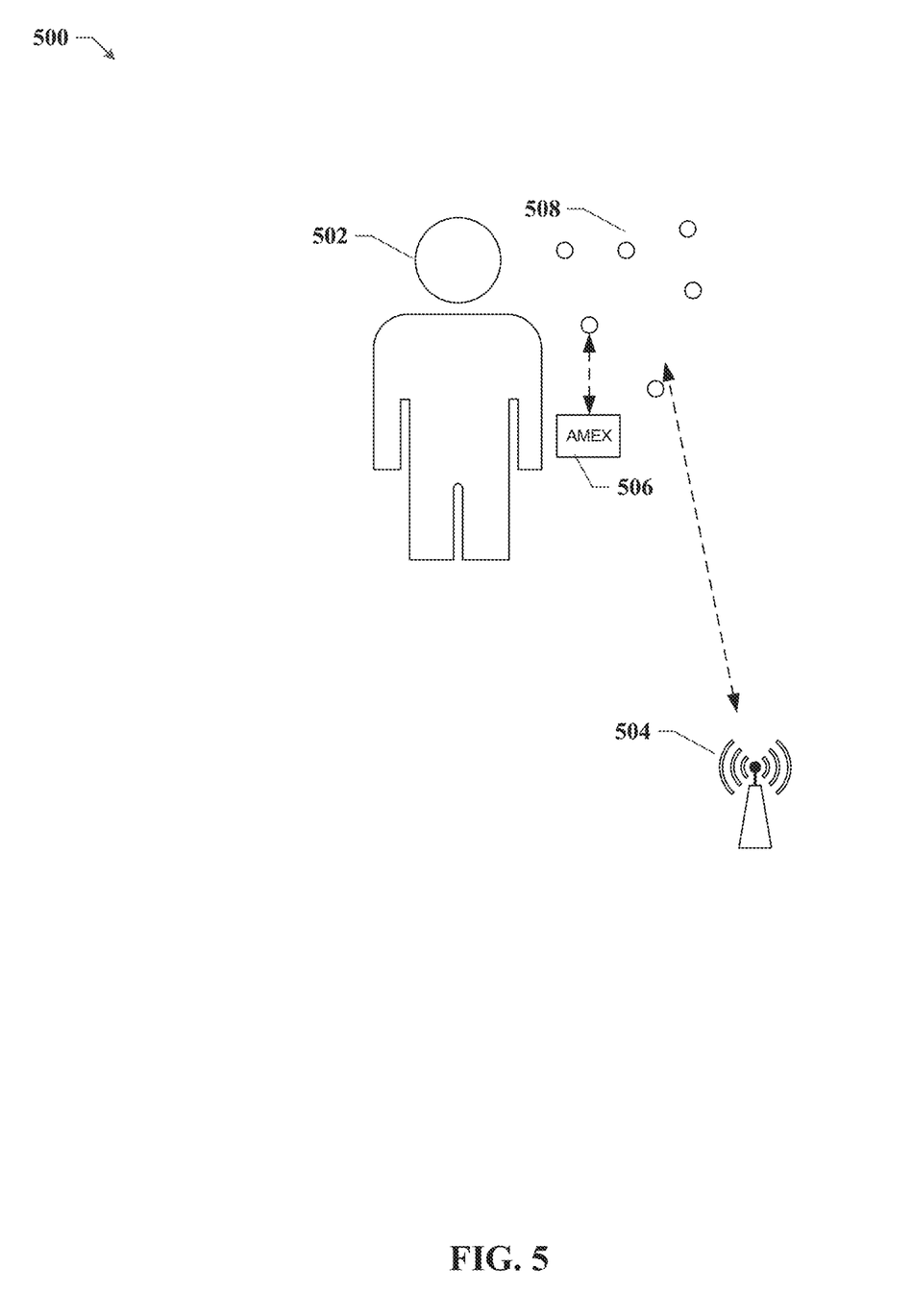
FIG. 5 is an illustration of an example system for authenticating a user using smart dust in accordance with one or more aspects of the disclosure.

Turning to FIG. 5, illustrated is an example system 500 for authenticating a user using smart dust in accordance with one or more aspects of the disclosure.

In an embodiment, the MEMs devices of the smart dust 508 can include respective identification numbers (e.g., serial numbers). When transmitting the sensor data to the base station device 504, the motes can send the serial numbers as well. Since the smart dust 508 may be issued to the user 502 by the financial institution associated with the credit card or payment method, the smart dust 508 serial numbers can also be used to authenticate the user 502 and allow the payment to proceed.

The serial numbers can be used to generate a virtual card number that is established based on a communication channel between the smart dust 104 and the credit card 506 or other payment method. Once the user 502 is authenticated, the virtual number can be used to process the payment. If the smart dust 104 is not in the vicinity of the credit card 506, the virtual number may not be generated, and the payment will not proceed. In an embodiment, the virtual number can be based on a function of the biometric data and the respective identification numbers.

Figure 6:
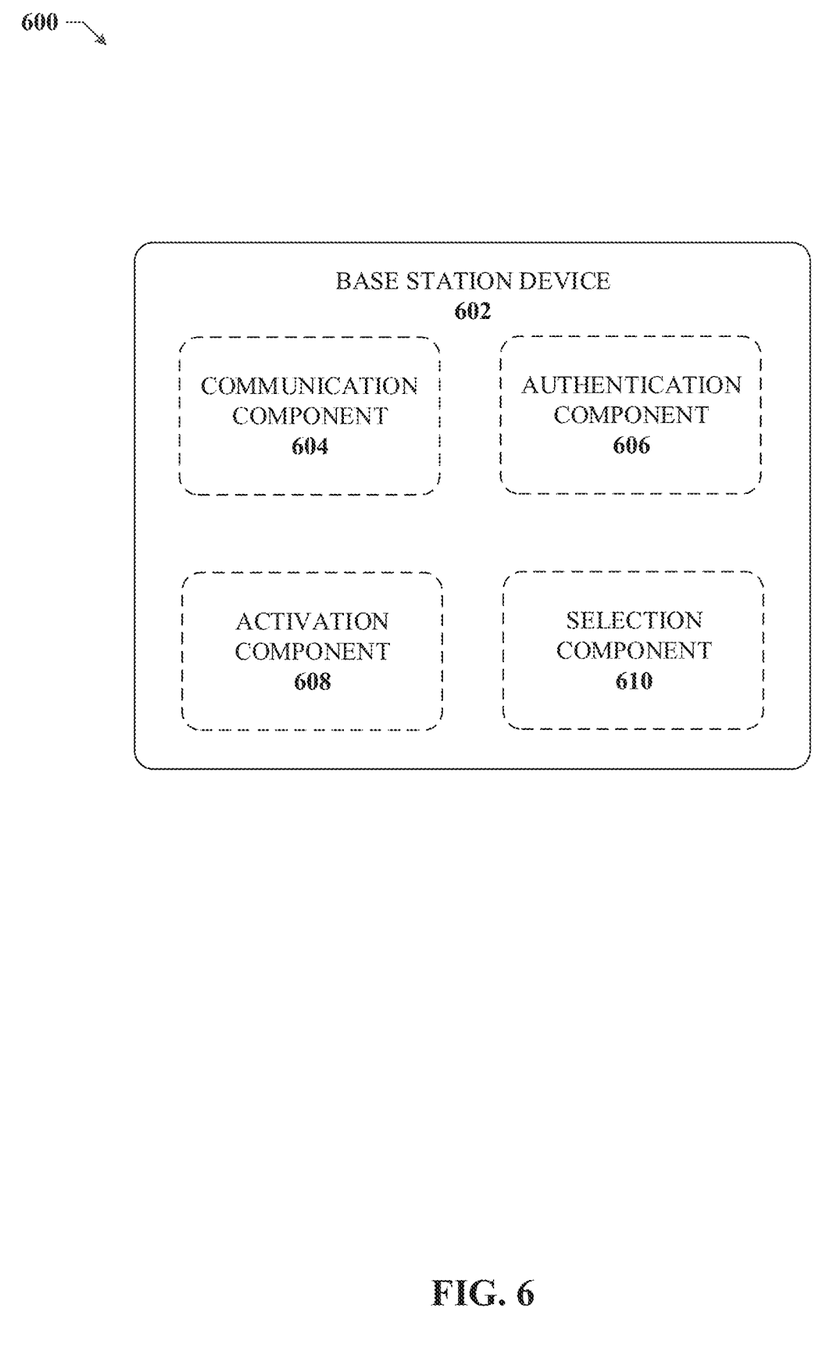
FIG. 6 is an illustration of an example base station device in accordance with one or more aspects of the disclosure.

Turning now to FIG. 6, illustrated is an example base station device system 600 in accordance with one or more aspects of the disclosure. Base station device 602 can include a communication component 604 configured to communicate with a server and with smart dust MEMs devices. The communication component 604 can receive a notification that there is a pending payment or an authorization request to base station device 602. Activation component 608 can then send an instruction to activate the smart dust via the communication component 604, which can proceed to collect sensor data relating to the user and return the data to communication component 604.

Based on the sensor data received the communication component 604, authentication component 606 can authenticate the user. Authentication component 606 can compare the sensor data received from the smart dust to a user profile, and based on the similarity, authenticate the user. For instance, if a set of biometric data matches the user profile stored biometric data within a predetermined range, then the user can be authenticated. If there are multiple types of biometric data being compared, the similarity may not need to be as close. For instance, if only data relating to facial recognition is collected, and the data matches 94% of the user profile data, then the authentication, which may require a 95% match, may fail. If the facial recognition data, which matches at 94%, is used in conjunction with heart rate data which also matches at 94%, then the authentication may be confirmed. Various matching rates can be authenticated based on the different combinations of sensor data types. Certain forms of biometric data may be considered of a higher quality, or functionality for the purposes of authentication than other types of biometric data. For instance, optical scanning which scans fingerprints can be more definitive for the purposes of authenticating a user than heart rate data. The predetermined matching levels can be set accordingly based on the type of data being collected.

Selection component 610 can determine whether to collect data from one or more of the motes of the set of MEMs devices that make the smart dust. For instance, the communications between the base station device 602 and the individual motes may have interference or increased packet loss (e.g., due to range from the base station device 602) for certain motes. If the signal to noise ratio for communications from particular motes to the base station device 602 is below a predetermined criterion, the mote may not be selected for authenticating the user. In other embodiments, the environmental context may reduce the efficacy of the sensor data received from certain types of sensors. For instance, if the lighting is poor, optical data may be of less value than temperature, audio and pressure data. In other embodiments, if the ambient noise level is high, optical data may be of more value than audio data.

In an embodiment, selection component 610 can also select a number of motes from which to collect data from based on a priority level or type of transaction requested. For instance, a low security login may only require data from one or two motes, whereas a higher level security login may request data from three or more motes before authenticating the login.

Figure 7:
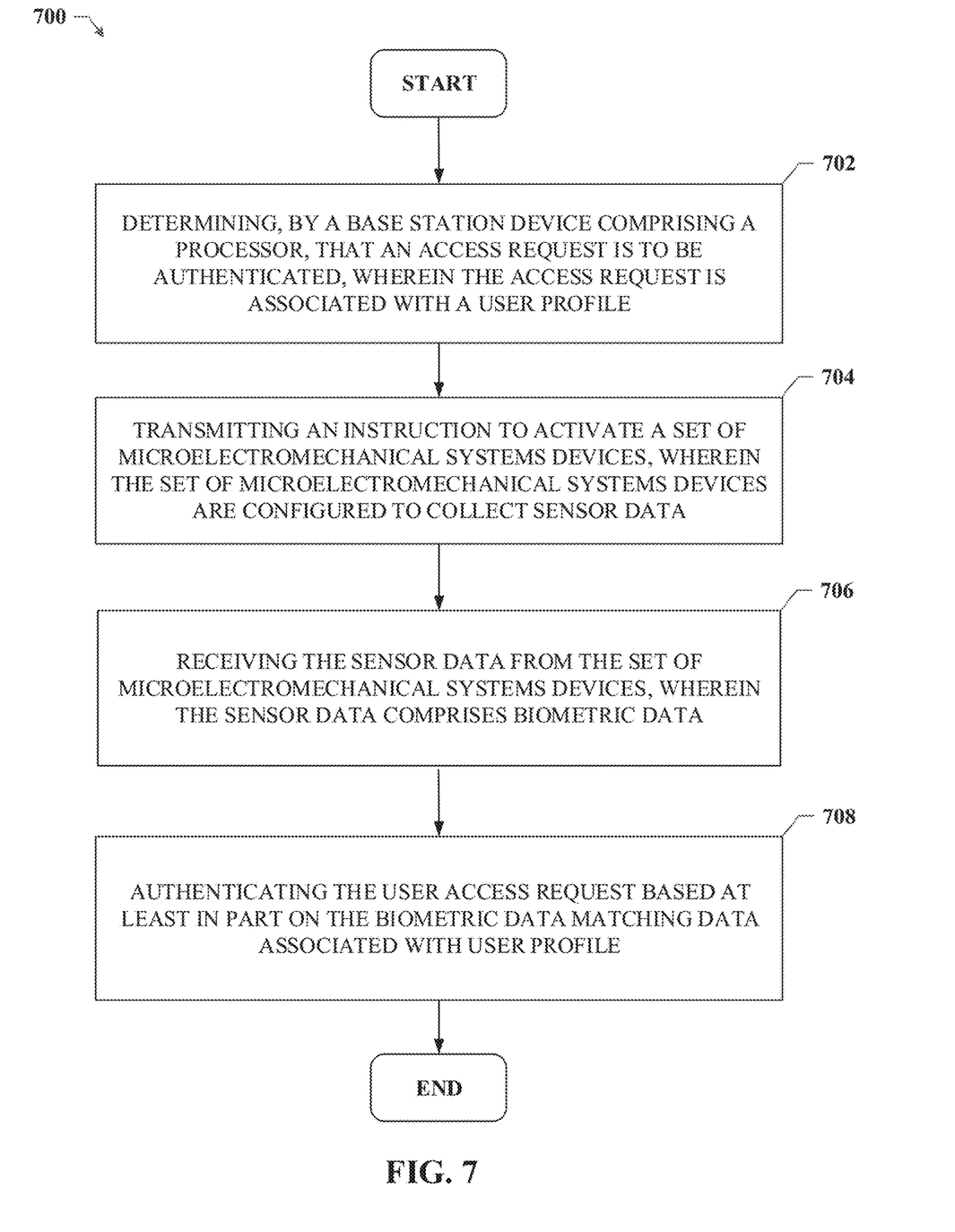
FIG. 7 is an illustration of an example flow chart of a method for authenticating a user using smart dust, according to one or more embodiments.
Figure 8:
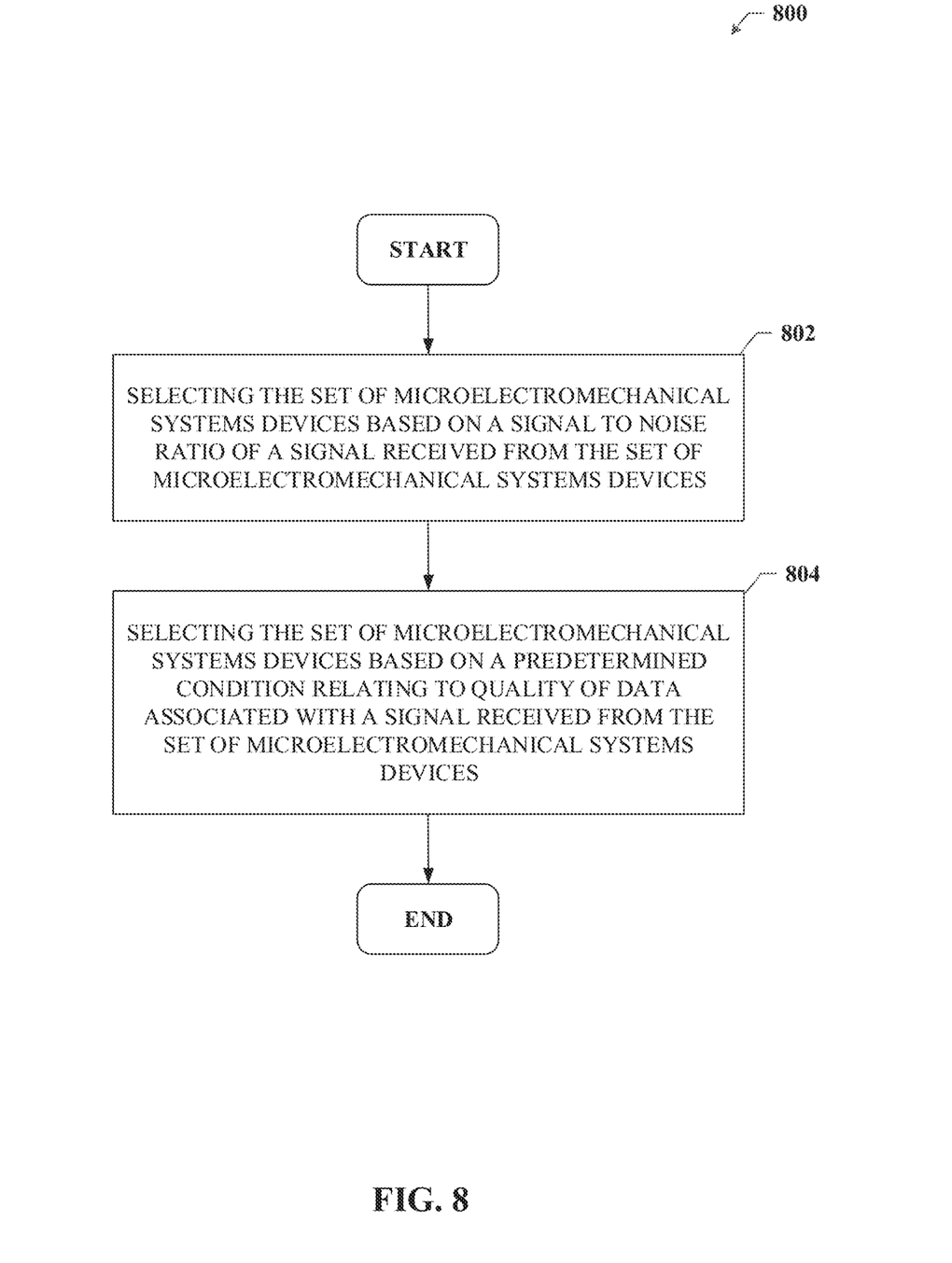
FIG. 8 is an illustration of an example flow chart of a method for authenticating a user using smart dust, according to one or more embodiments.

FIGS. 7-8 illustrates processes in connection with the aforementioned systems. The process in FIGS. 7-8 can be implemented for example by systems and methods 100, 200, 300, 400, 500, and 600 illustrated in FIGS. 1-6 respectively. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Turning now to FIG. 7, illustrated is an example flow chart of a method 700 for receiving and broadcasting application updates, according to one or more embodiments. The method can start at 702, where the method includes determining, by a base station device comprising a processor, that an access request is to be authenticated, wherein the access request is associated with a user profile. At 704, the method includes transmitting an instruction to activate a set of microelectromechanical systems devices, wherein the set of microelectromechanical systems devices are configured to collect sensor data. At 706, the method includes receiving the sensor data from the set of microelectromechanical systems devices, wherein the sensor data comprises biometric data. At 708 the method includes authenticating the user access request based at least in part on the biometric data matching data associated with user profile.

Turning now to FIG. 8, illustrated is a method 800 for receiving and broadcasting application updates, according to one or more embodiments. At 802 the method includes selecting the set of microelectromechanical systems devices based on a signal to noise ratio of a signal received from the set of microelectromechanical systems devices. At 804 the method includes selecting the set of microelectromechanical systems devices based on a predetermined condition relating to quality of data associated with a signal received from the set of microelectromechanical systems devices.

Figure 9:
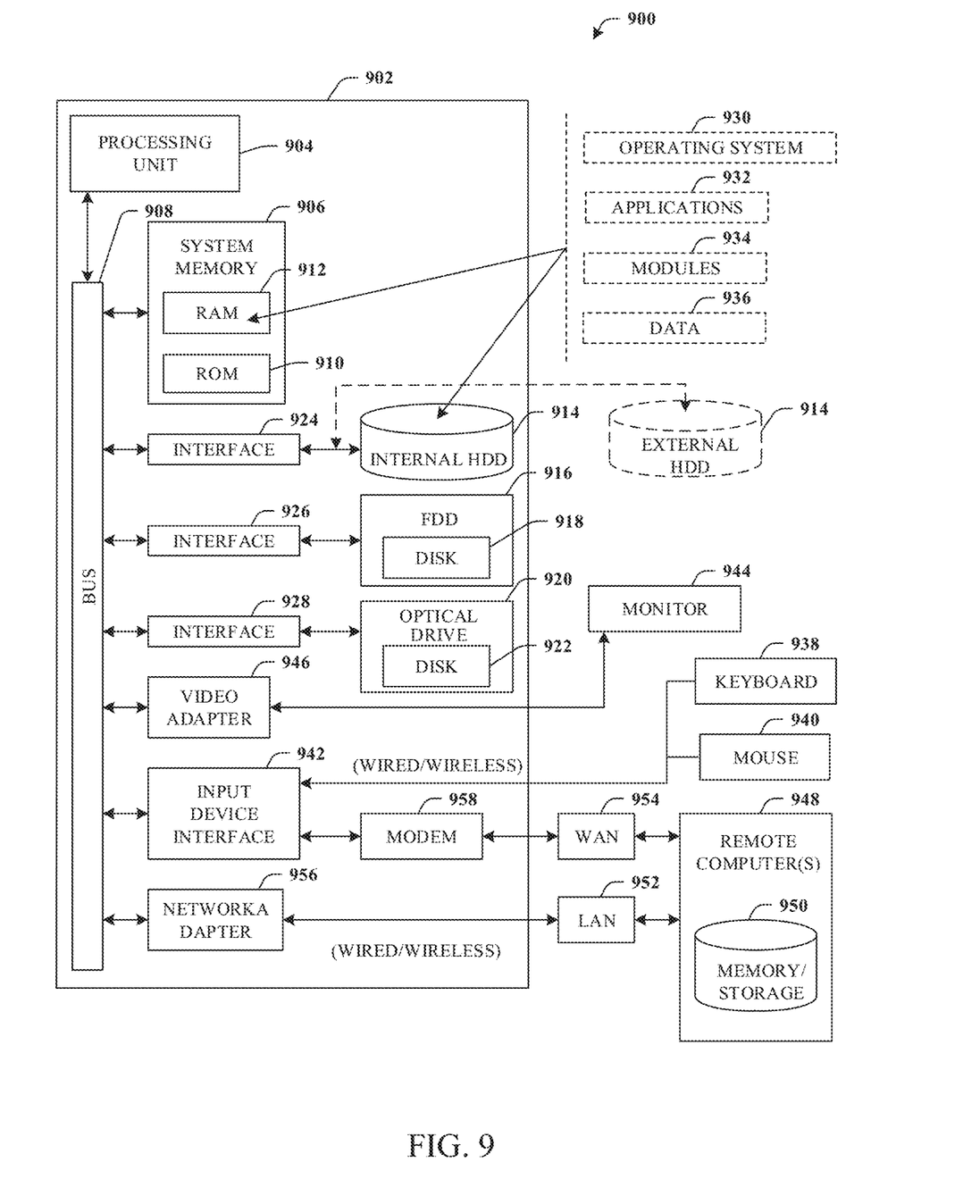
FIG. 9 is an illustration of an example computing environment where one or more of the provisions set forth herein are implemented, according to one or more embodiments.

Referring now to FIG. 9, there is illustrated a block diagram of a computer operable to execute the disclosed architecture. In order to provide additional context for various aspects of the subject innovation, FIG. 9 and the following discussion are intended to provide a brief, general description of a suitable computing environment 900 in which the various aspects of the innovation can be implemented. While the innovation has been described above in the general context of computer-executable instructions that may run on one or more computers, those skilled in the art will recognize that the innovation also can be implemented in combination with other program modules or components and/or as a combination of hardware and software.

Generally, program modules include routines, programs, components, data structures, etc., that perform particular tasks or implement particular abstract data types. Moreover, the inventive methods can be practiced with other computer system configurations, including single-processor or multi-processor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 9, the exemplary environment 900 for implementing various aspects of the innovation includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read-only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, other types of media which are readable by a computer, such as zip drives, magnetic cassettes, flash memory cards, cartridges, and the like, may also be used in the exemplary operating environment, and further, that any such media may contain computer-executable instructions for performing the methods of the innovation.

A number of program modules can be stored in the drives and RAM 912, including an operating system 930, one or more application programs 932, other program modules 934 and program data 936. All or portions of the operating system, applications, modules, and/or data can also be cached in the RAM 912. The innovation can be implemented with various commercially available operating systems or combinations of operating systems.

A user can enter commands and information into the computer 902 through one or more wired/wireless input devices, e.g., a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc.

A monitor 944 or other type of display device is also connected to the system bus 908 via an interface, such as a video adapter 946. In addition to the monitor 944, a computer typically includes other peripheral output devices (not shown), such as speakers, printers, etc.

The computer 902 may operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which may connect to a global communications network, e.g., the Internet.

When used in a LAN networking environment, the computer 902 is connected to the local network 952 through a wired and/or wireless communication network interface or adapter 956. The adapter 956 may facilitate wired or wireless communication to the LAN 952, which may also include a wireless access point disposed thereon for communicating with the wireless adapter 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 via the serial port interface 942. In a networked environment, program modules or components depicted relative to the computer 902, or portions thereof, can be stored in the remote memory/storage device 950. The network connections shown are exemplary and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to wired Ethernet networks used in many offices.

Figure 10:
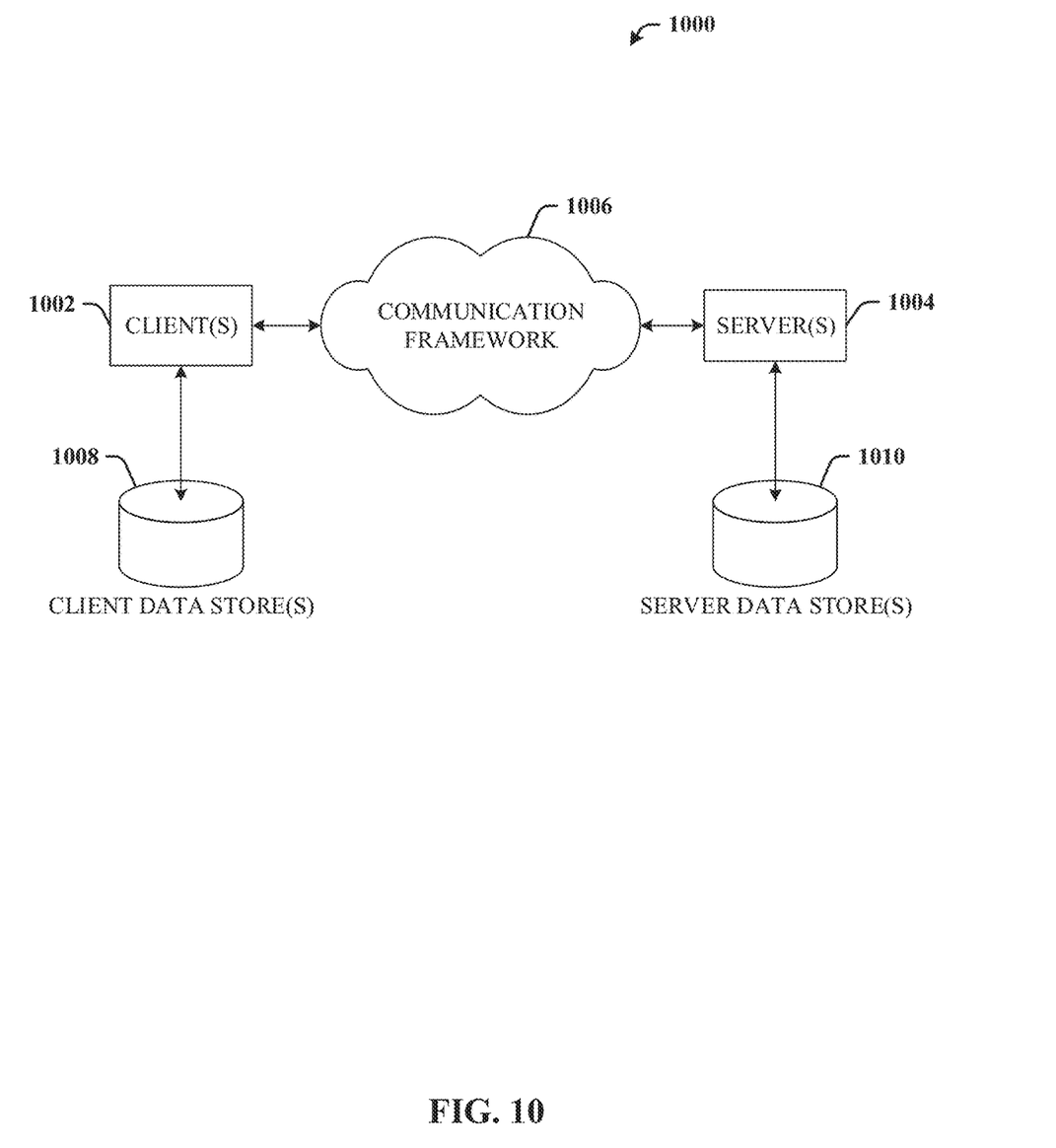
FIG. 10 is an illustration of an example computing environment where one or more of the provisions set forth herein are implemented, according to one or more embodiments.

Referring now to FIG. 10, there is illustrated a schematic block diagram of an exemplary computing environment 1000 in accordance with the subject innovation. The system 1000 includes one or more client(s) 1002. The client(s) 1002 can be hardware and/or software (e.g., threads, processes, computing devices).

The system 1000 also includes one or more server(s) 1004. The server(s) 1004 can also be hardware and/or software (e.g., threads, processes, computing devices). The servers 1004 can house threads to perform transformations by employing the innovation, for example. One possible communication between a client 1002 and a server 1004 can be in the form of a data packet adapted to be transmitted between two or more computer processes. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002. Similarly, the server(s) 1004 are operatively connected to one or more server data store(s) 1010 that can be employed to store information local to the servers 1004.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A base station device, comprising:
a set of microelectromechanical systems (MEMS) each comprising one or more sensors;
a memory to store computer-executable instructions; and
a processor, coupled to the memory, to facilitate execution of the computer-executable instructions to perform operations, comprising:
receiving a user access request for authentication associated with a pending payment request;
in response to receiving the user access request, transmitting an instruction to activate and release the set of MEMS from the base station device;

dynamically selecting a subset of the set of MEMS from which to collect sensor data based on an environmental context in which the set of MEMS is present;
transmitting an instruction to the subset of MEMS to collect the sensor data;
receiving the sensor data from the subset of MEMS, wherein the sensor data comprises biometric data;
generating a smart key based on the subset of MEMS, wherein respective identification numbers of the subset of MEMS form a pattern used in the generation of the smart key; and
authenticating the user access request based at least in part on the biometric data and the smart key.

2. The base station device of claim 1, wherein the sensor data comprises audio data, optical data, temperature data, pressure data, and motion data.

3. The base station device of claim 1, wherein the biometric data comprises at least one of height data, weight data, heart rate data, blood pressure data, and body temperature data.

4. The base station device of claim 1, wherein the subset of MEMS is suspended in air.

5. The base station device of claim 1, wherein the set of MEMS are associated with a financial institution related to the user access request.

6. The base station device of claim 1, wherein authenticating the user access request includes the biometric data satisfying a predetermined condition associated with similarity to user profile information.

7. The base station device of claim 1, wherein the base station device is part of a point of sale system at a retail or customer service establishment.

8. The base station device of claim 4, wherein the set of MEMS are self-propelled.

9. The base station device of claim 1, wherein the operations further comprise:
generating a virtual card number based on a function of the biometric data and the respective identification numbers of the subset of MEMS; and
processing a payment associated with the pending payment request using the virtual card number.

10. A method, comprising:
receiving, by a base station device comprising a processor, a user access request is to for authentication associated with a pending payment request;
in response to receiving the user access request, transmitting an instruction to activate and release a set of microelectromechanical systems (MEMS) from the base station device, wherein each microelectromechanical system of the set of MEMS comprises one or more sensors;
dynamically selecting a subset of the set of MEMS from which to collect sensor data based on an environmental context in which the set of MEMS is present;
transmitting an instruction to the subset of MEMS to collect the sensor data;
receiving the sensor data from the subset of MEMS, wherein the sensor data comprises biometric data;
generating a smart key based on the subset of MEMS, wherein respective identification numbers of the subset of MEMS form a pattern used in the generation of the smart key; and
authenticating the user access request based at least in part on the biometric data and the smart key.

11. The method of claim 10, wherein the sensor data comprises audio data, optical data, temperature data, pressure data, and motion data and the biometric data comprises at least one of height data, weight data, pulse data, blood pressure data, and body temperature data.

12. The method of claim 10, wherein the set of MEMS are associated with a financial institution associated with the user access request.

13. The method of claim 10, further comprising:
selecting the subset of MEMS based on a quality of data associated with a signal received from the set of MEMS.

14. The method of claim 10, further comprising:
generating a virtual card number based on a function of the biometric data and the respective identification numbers of the subset of MEMS; and
processing a payment associated with the pending payment request using the virtual card number.

15. A system comprising:
a base station device comprising a set of microelectromechanical systems (MEMS) each comprising one or more sensors; and
a non-transitory computer-readable device, storing thereon, computer-executable instructions, that when executed by a processing device, perform operations, comprising:
receiving a user access request for authentication associated with a pending payment request;
in response to receiving the user access request, transmitting an instruction to activate and release the set of MEMS from the base station device;
dynamically selecting a subset of the set of MEMS from which to collect sensor data based on an environmental context in which the set of MEMS is present;
transmitting an instruction to the subset of MEMS to collect the sensor data;
receiving the sensor data from the subset of MEMS, wherein the sensor data comprises biometric data;
generating a smart key based on the subset of MEMS, wherein respective identification numbers of the subset of MEMS form a pattern used in the generation of the smart key; and
authenticating the user access request based at least in part on the biometric data and the smart key.

16. The system of claim 15, wherein the operations further comprise:
selecting the subset of MEMS based on a function of a signal-to-noise ratio of a signal received from the subset of MEMS.

17. The system of claim 15, wherein the operations further comprise:
generating a virtual card number based on a function of the biometric data and the respective identification numbers of the subset of MEMS; and
processing a payment associated with the pending payment request using the virtual card number.

* * * * *